United States Patent [19]

Moss

[11] Patent Number: 4,694,954
[45] Date of Patent: Sep. 22, 1987

[54] COMPACT DISC DISPENSING AND STORAGE ASSEMBLY

[76] Inventor: Ira L. Moss, 176 Beach 146th St., Neponset, Queens, N.Y. 11694

[21] Appl. No.: 909,584

[22] Filed: Sep. 22, 1986

Related U.S. Application Data

[63] Continuation-in-part of Ser. No. 788,932, Sep. 22, 1986, Pat. No. 4,620,630.

[51] Int. Cl.$^4$ ............................................... B65D 85/57
[52] U.S. Cl. .............................. 206/45.26; 206/45.24; 206/312; 229/68 R; 229/920; 229/DIG. 4
[58] Field of Search ............... 206/45.24, 44 R, 45.33, 206/309–313, 45.26; 229/48 R, 68 R, 72, 920, DIG. 4

[56] References Cited

U.S. PATENT DOCUMENTS

| | | | |
|---|---|---|---|
| 1,276,101 | 8/1918 | Oakley | 229/72 |
| 2,356,078 | 8/1944 | Myers | 229/68 R |
| 3,129,872 | 4/1964 | Lutwack | 229/72 |
| 3,516,599 | 6/1970 | Buttery | 229/72 |
| 3,556,391 | 1/1971 | Kosterka | 206/312 |
| 3,643,858 | 2/1972 | Deckys | 229/72 |
| 3,870,223 | 3/1975 | Wyant | 229/72 |

FOREIGN PATENT DOCUMENTS

| | | | |
|---|---|---|---|
| 0273039 | 11/1968 | Austria | 229/72 |
| 0530158 | 7/1954 | Belgium | 229/68 R |

*Primary Examiner*—Stephen Marcus
*Assistant Examiner*—Jimmy G. Foster
*Attorney, Agent, or Firm*—Arthur B. Colvin

[57] ABSTRACT

An article of manufacture comprising a compact disc and convertible package therefor is disclosed. The device comprises a blank divided into four panel members by cruciform pairs of parallel intersecting fold lines. A flap portion is formed adjacent a surface of at least one of said panels and the compact disc is received between the flap and panel. In the merchandizing mode, a stiffener member is interposed between the leaves formed by double height panels, the components being held together by an encompassing film which is preferably transparent. The device may be converted to the storage mode by removing the film, discarding the stiffener member, and folding the panels about the cruciform fold lines to provide a structure in which the disc is encompassed between four thicknesses of material. Tendencies of the device to buckle or expand when in the storage mode are minimized by removing the portion of the blank which encompasses the intersection of the hinge lines, and by connecting the flap to one of the panels in a tensioned condition.

8 Claims, 5 Drawing Figures

COMPACT DISC DISPENSING AND STORAGE ASSEMBLY

This invention is a continuation in part of my co-pending application Ser. No. 788,932 filed Sep. 22, 1986 and entitled "Compact Disc in Convertible Enclosure", now U.S. Pat. No. 4,620,630.

BACKGROUND OF THE INVENTION

1. Field of the Invention

The present invention is directed to improvements in the field of compact discs and specifically relates to an article of manufacture comprised of a compact disc and display enclosure therefore, the enclosure being convertible from a display or merchandising mode to a storage mode.

2. Prior Art

The compact disc or CD is becoming a progressively more popular medium for the replication of music in the home. The compact disc comprises a thin polymeric circular member approximately 4¾ inches (12 centimeters) in diameter and having a central aperture adapted to be received on the spindle or centering mechanism of a disc player. The compact disc incorproates on a surface thereof digitally encoded information adapted to be laser read by the disc player. It is possible to incorporate an hour or more of music on a single compact disc and it is generally agreed that the quality of musical reproduction of the disc equals or exceeds the quality of music obtainable with the finest of conventional long playing records.

At present, compact discs are costly to manufacture and accordingly, sell at retail prices in the range of about $14.00 to $20.00 per disc.

As noted in my above referenced application, now U.S. Pat. No. 4,620,630, the substance of which is hereby incorporated by reference, disc containers known before the advent of the above referenced application were expensive, fragile, and subject to pilferage due to their small size.

As noted in the discussion of the above referenced application, discs heretofor were marketed in polymeric boxes which, for purposes of pilferage reduction, were bonded to enlarged cardboard sheets or panels or encased in large plastic enclosures to reduce the likelihood of a thief secreting the package in a pocket. After purchase, the cardboard or plastic was stripped away and the disc stored in the polymeric enclosure.

In addition to being expensive, the polymeric enclosures were susceptible to cracking, breakage of the hinges, and in addition, the overall thickness of the so-called "jewel box" package was far greater than necessary for protection of the disc making the storage of multiple discs unduly wasteful of space.

SUMMARY OF THE INVENTION

The present invention may be summarized as directed to a new article of manufacture, namely to a combination of compact disc and enclosure therefore, characterized in that the enclosure is convertible by folding from a merchandising mode, in which mode the composite article is sufficiently large to minimize the likelihood of shoplifting, to a compact storage mode.

A further characterizing feature of the invention is the provision of a device of the type described wherein the disc is protected against bending or warpage, both in the merchandising mode and the storage mode. Still a further characterizing feature of the invention resides in the provision of a disc and storage device which is significantly lower in cost than conventional "jewel box" packages and is also substantially thinner. Still a further object of the invention is the provision of an article of the type described which in the storage mode is comprised of a single blank of folded cardboard, the blank being so constructed and arranged as to maintain its essentially flatwise configuration, i.e., to be virtually free of any tendency to buckle or spread, thereby minimizing storage problems.

In accordance with the invention, a single blank is provided with one or more integral flap members adapted to be folded and bonded to the blank such as to provide partially open envelopes for the retention of a disc or discs, and, in addition, informative or instructional materials. The blank is formed with pairs of cruciform hinge lines including a space between the parallel hinge lines. A cutout portion is formed in the blank in registry with the intersection of the cruciform lines whereby in the storage mode the tendency of the flaps defining the enclosure for the discs to spread apart is minimized. Additionally, the flaps are secured to the main body of the blank in a tensioned condition as more particularly described hereinafter to thereby further minimize any tendency of the leaves to spread or buckle.

The device is initially distributed in a sales or merchandising mode in which the device is essentially twice te height of the disc. In the merchandising mode, a stiffener member may be disposed between the leaves of the double height device, the elements being maintained in assembled condition by a transparent shrink wrap, which holds the leaves closed about the stiffener.

After purchase, the enclosing wrapper is removed, the stiffener discarded and the device folded about the spaced horizontal fold lines to form the final storage package.

It is accordingly an object of the invention to provide an economical, thief and tamper resistant article comprised of a compact disc and container which may be readily converted from an enlarged distribution or display mode to a compact storage mode.

Still a further object of the invention is the provision of a device of the type described which is inexpensive to manufacture and yet affords full protection to the fragile compact disc both in its distribution mode and in its storage mode. Still other and further objects of the invention will appear herein or be hereinafter pointed out in connection with the ensuing description.

BRIEF DESCRIPTION OF THE DRAWINGS

An embodiment of the inventio is disclosed in the accompanying drawings wherein.

DETAILED DESCRIPTION OF DRAWINGS

Figure 1:
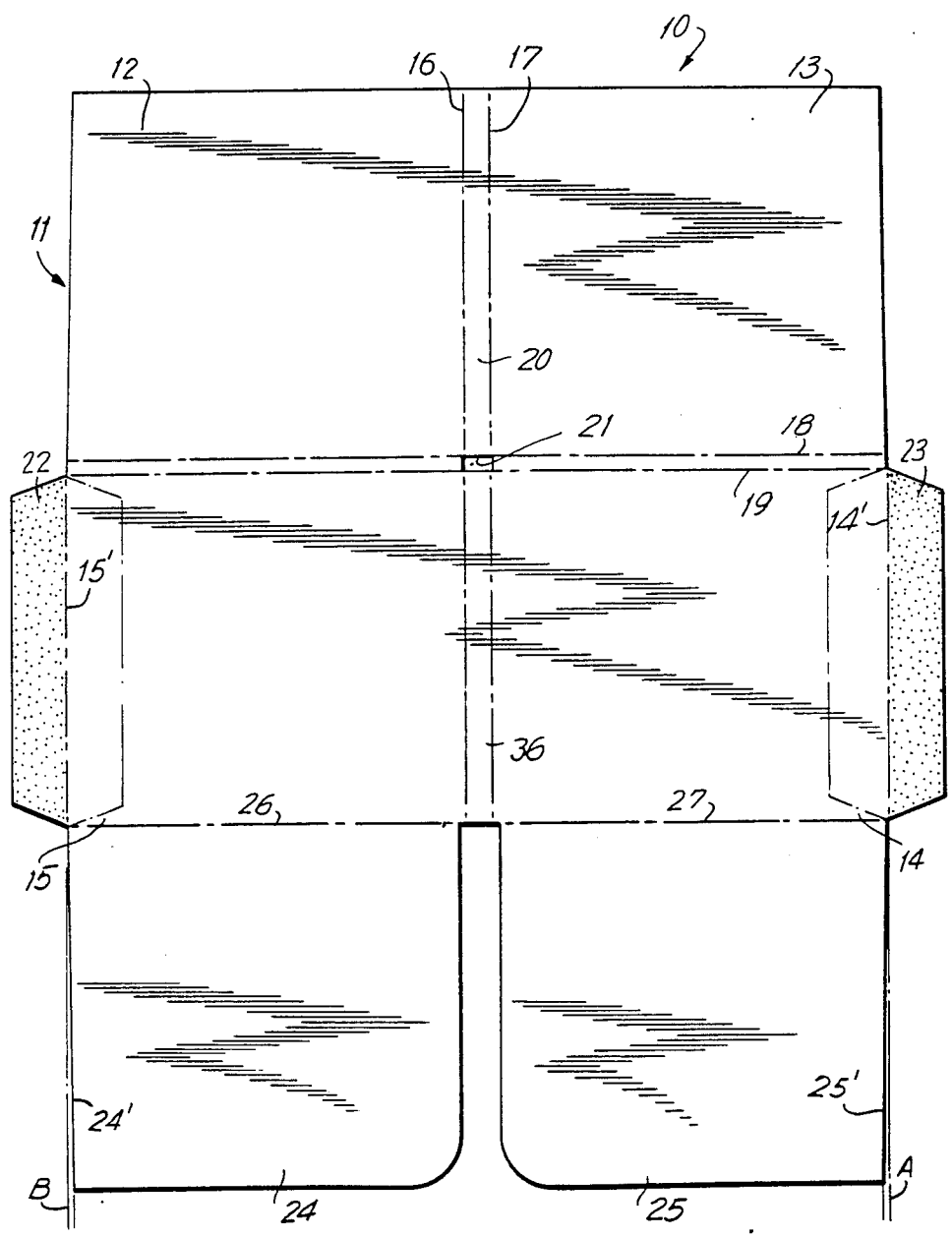
FIG. 1 is a plan view of the inner face of a blank from which the container of the device is fabricated.

There is shown in FIG. 1 a blank 10 of relatively rigid cardboard, the surfaces of which have been finished to provide a medium for accepting informative materials, decorative printing, or the like. In FIG. 1, the upwardly disposed face will form the inner surfaces of the receptacle for the compact disc.

The blank includes a generally rectangular body portion 11 comprised of four generally square portions 12, 13, 14, and 15, the portions being separated by cruciform fold or hinge lines, namely vertically directed spaced hinge lines 16 and 17, and horizontally directed fold or hinge lines 18 and 19. The hinge lines 16 and 17, which preferably are spaced apart a distance somewhat wider than the spacing between hinge lines 18 and 19, define therebetween a vertically directed spine 20.

A portion 21 encompassing the intersection of the vertical and horizontal hinge lines is removed from the blank for purposes which appear hereinafter. The side marginal edge 15' of quadrant portion 15 includes a laterally projecting tab member 22. In similar fashion, the side marginal edge 14' of quadrant 14 includes laterally extending tab portion 23. The first and second flap members 24, 25, respectively, are hingedly connected to the lowermost edge 26 of quadrant 15 and lowermost edge 27 of quadrant 14 respectively.

As will be appreciated from FIG. 1, the side marginal edge 24' of flap 24 is cut with a slight inward bias as respects the marginal edge 15' of quadrant 15. In similar fashion side marginal edge 25' is cut at a slight inward bias as respects marginal edge 14' of quadrant 14.

For purposes of illustration, there is shown in FIG. 1 lines A and B, which constitute projections of the margins 14' and 15' from which it will be appreciated that the bias cut of edges 24' and 25' amount to an angular offset of only about 2 to 4 degrees.

The blank is assembled by folding the tabs 22 and 23 inwardly into the dot and dash positions whereat they overlay the exposed surface of the blank as illustrated in FIG. 1. An adhesive is placed on the then uppermost faces of the tabs 22 and 23 and thereafter flap portions 24 and 25 are folded upwardly into contact with the adhesive coated faces of the tabs. In attaching the flaps to the tabs, the flaps 24 and 25 are stressed in a lateral outward direction such that edge 24' registers more or less precisely with margin 15' of quadrant 15. In similar fashion, flap 25 is folded upwardly such that margin 25' is in registry with margin 14' of sector 14. By the outward stressing of the flaps as above described, the flaps are induced to lie flatwise against the segments 14 and 15 respectively, without bulging or buckling.

After the flaps have been formed as aforesaid, a compact disc member which may be enclosed within an open mouthed thin envelope, not shown, may be sleeved into the space between sector 15 and flap 24. In similar fashion, a second disc may be interposed between flap 25 and sector 14 or a brochure or like set of instructional materials may be disposed in such space. It will be observed that the flaps 24 and 25 are secured to the other portions of the blank along only two edges thereby facilitating insertion of materials through the two remaining unattached edges of the flap.

Figure 2:
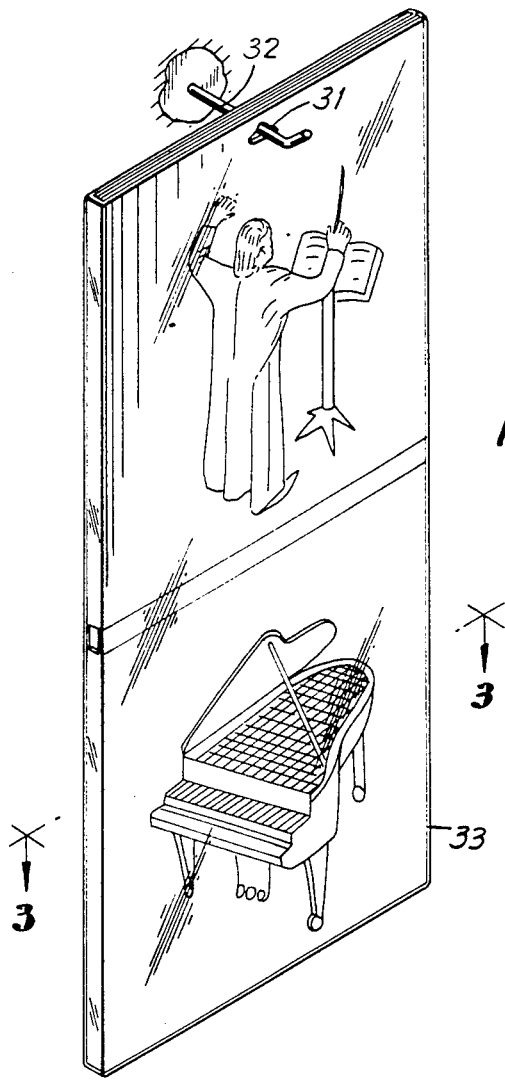
FIG. 2 is a perspective view of the device in accordance with the invention in its distribution mode.
Figure 3:
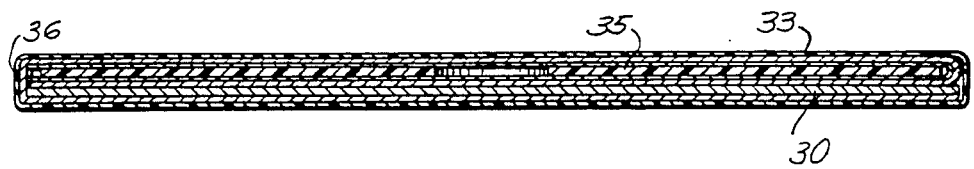
FIG. 3 is a magnified horizontal section taken on the line 3—3 of FIG. 2.

The device is completed, i.e., is assembled to its distributing or merchandising mode illustrated in FIG. 2 by folding the blank along the horizontal fold lines 18 and 19 after enclosing within the leaves defined by the quadrants 12 and 13 on one hand and 14 and 15 on the other, a stiffener member 30 which is preferably rectangular in plan and is sized at least to extend above the vertical fold lines 16 and 17, and preferably to extend substantially the full height of the folded leaves.

As best seen in FIG. 2, the aligned faces of the leaves may be formed with through going registering apertures 31 enabling the device to be mounted on a hook or peg member 32 forming a part of a merchandising display rack. The assembled device is enclosed within a transparent shrink wrap film or foil 33 which encompasses the entirety of the device and holds the various components in their assembled condition.

After purchase, the wrap 33 is removed and the stiffener member 30 discarded providing access to the disc or discs, e.g. 34, 35, by opening the leaves along the pivot or hinge lines 18, 19.

Figure 4:
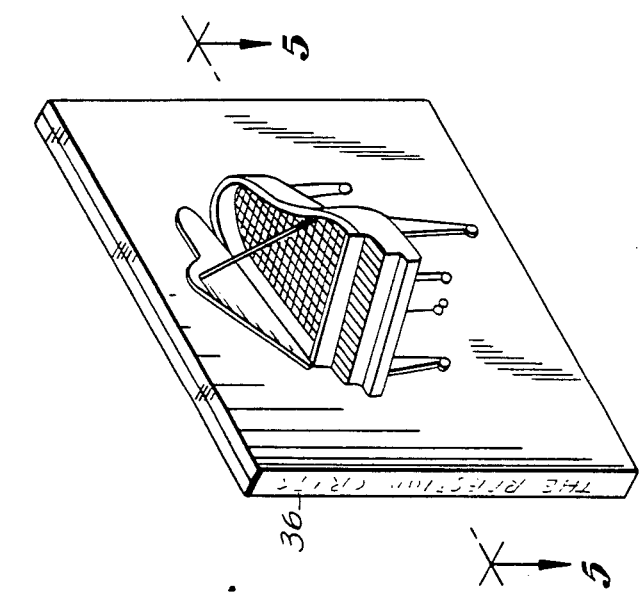
FIG. 4 is a perspective view of the device in its storage mode.
Figure 5:
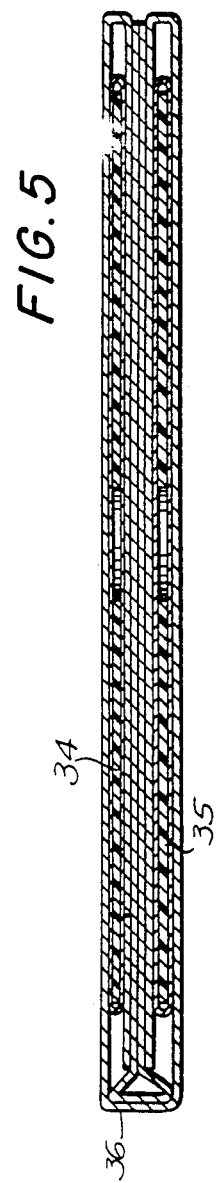
FIG. 5 is a magnified horizontal section taken on the line 5—5 of FIG. 4.

For purposes of storage, the blank is refolded to the configuration shown in FIG. 4. This is accomplished by first folding quadrants 12, 13 into registry with quadrants 14, 15, in an inward direction, (i.e., upwardly toward the viewer when viewed in the orientation of FIG. 1), about the fold lines 18 and 19. Thereafter, the combined quadrants 12 and 15 are folded over the superposed quadrants 13 and 14 bringing the parts into the position shown in FIG. 5.

It is important to note that the device when sifted to the position shown in FIG. 4 is resistant to buckling and to tendencies to spread to an open or partially open condition. This effect is considered to result from the tensioned folding of the flap forming components 24 and 25 as previously described and from the aperture 21 struck from the body of the blank in the area of the intersection of the cruciform vertical and horizontal fold or hinge lines.

As will be readily recognized by those skilled in the art and acquainted with the instant disclosure, the various surfaces of the packaging may be marked with appropriate decorative or identifying mechanisms. By way of example, the obverse surface of the spine 20 in the area 36 may carry the title of the work encoded on the compact disc. Similarly, other portions of the interior and exterior surfaces of the package may bear informative or decorative materials as desired. The device, in accordance with the inventio, is highly resistant to pilferage of the disc in the merchandising mode due to the enlarged size of the unit, and the fact that the disc may not be removed without a complete removal of the transparent wrapper material. The unit is far less expensive than conventional "jewel pack" types of containers as heretofor employed, and yet in the storage mode affords substantial protection to the disc through the fact that four layers of rigid material lie in superposed condition in such mode.

As will be apparent to those skilled in the art, numerous variations in details of construction may be made in the illustrated embodiment without departing from the spirit of the invention. Accordingly, the same is to be broadly construed within the scope of the appended claims.

What is claimed as new and sought to be protected by Letters Patent of the United States is:

1. As a new article of manufacture, a compact disc and packaging assembly convertible from a merchandising to a storage mode comprising an integral generally rectangular blank of rigid material, a cruciform fold structure formed in said blank, said structure including a proximately spaced first pair of longitudinal fold lines extending substantially medially of said blank and dividing said blank into front and rear panels separated by a longitudinal spine portion and a proximately spaced second pair of fold lines extending substantially medially of said blank in a (transversed) transverse direction and dividing said blank into upper and lower panels separated by a transverse spine portion, a flap member including first and second margins connected to a surface of said blank along a side and bottom edge respectively of one of said panels, the longitudinal and transverse extent of said flap being less than the (distance between said edges and said foldlines) longitudinal and transverse dimensions respectively of said panels, a compact disc member at least partially encompassed int he space betwen said flap and said one of said panels, said blank being folded inwardly about said first fold lines to dispose said flap member betwen said front and rear panels, a planar stiffener member interposed between said front and rear panels in registry with said flap member, said stiffener member extending from said bottom edge to a level at least above said second pair of fold lines, and a removable transparent film member encompassing and sealing said device and maintaining said front and rear panels and said stiffener member in substantial coplanar alignment, said blank after removal of said film and stiffener member being foldable about said first and second pairs of fold lines to define a compact storage container for said disc.

2. An article in accordance with claim 1 wherein the portions of said blank encompassing the intersection of said first and second fold lines have been removed.

3. An article in accordance with claim 2 wherein said flap member is integrally formed with said blank.

4. An article in accordance with claim 3 wherein one said connected margin of said flap member is secured to said one panel under tension applied in a direction away from the fold line parallel to said margin, whereby said flap is secured in stretched condition and urged to lie substantially flatwise against said one panel.

5. An article in accordance with claim 4 and including a second said flap formed on said surface of said blank, said second flap being secured to the panel lying to the opposite side of said first pair of fold lines from said one panel.

6. As a new article of manufacture, a compact disc and convertible display shiftable between merchandising and storage codes comprising front and rear rigid and congruent panel members separated by a first pair of spaced parallel hinge lines, said lines defining therebetween a vertically extending spine portion, a second spaced parallel pair of hinge lines formed medially of said panel members and extending transversely of said first pair of hinge lines, said second pair of hinge lines defining a spine portion therebetween, said second pair of hinge lines dividing said front and rear panel members into upper and lower sections, the portions of said panel member encompassing the intersection of said first and second pairs of hinge lines being removed, a flap portion formed on a first surface of a section of one said panel member, a disc member disposed between flap portion and said one section, said panel members being folded about said first pair of hinge lines such that said first surfaces of said members are justaposed in parallel spaced relation, a planar stiffener member interposed between said panel members in spanning relation of said second pair of hinge lines, and a removable film member encompassing said justaposed panel members and retaining said panel members and hence said disc and stiffener in said positions.

7. As a new article manufacture, a compact disc container comprising an integral generally rectangular blank of rigid material, a cruciform fold structure formed in said blank, said structure including a proximately spaced first pair of parallel longitudinal fold lines extending substantially medially of said blank and dividing said blank into front and rear panels separated b a longitudinal spine portions and a proximately spaced second pair of transverse parallel fold lines extending substantially medially of said blank in a transverse direction and dividing said blank into upper and lower panels separated by a transverse spine portion, the portions of said blank encompassing the intersection of said first and second pairs of fold lines being removed, an integral flap member formed on said blank, said flap member being of lesser size than said panels and including a fold line defining a first common margin with one of said lower panels, said flap being folded into parallel relation to said one lower panel and including a second margin bonded to a second outer margin of said one lower panel, said flap being tensioned in a direction away from that pair of said fold lines parallel to said second margin when bonded whereby said flap is secured in stretched condition and urged to lie substantially flatwise against said one lower panel, said container being in a folded condition wherein the same is first folded about said transverse fold lines and thereafter folded about said longitudinal fold lines.

8. An article in accordance with claim 7 and including a compact disc member interposed between said one lower panel and said flap member.

* * * * *